(12) United States Patent
Hsiao et al.

(10) Patent No.: US 8,810,507 B2
(45) Date of Patent: Aug. 19, 2014

(54) ELECTRONIC PAPER DISPLAY DEVICE

(75) Inventors: Po-Wen Hsiao, Hsinchu (TW);
Kai-Cheng Chuang, Hsinchu (TW);
Tzu-Ming Wang, Hsinchu (TW)

(73) Assignee: E Ink Holdings Inc., Hsinchu (TW)

( * ) Notice: Subject to any disclaimer, the term of this patent is extended or adjusted under 35 U.S.C. 154(b) by 20 days.

(21) Appl. No.: 12/985,085

(22) Filed: Jan. 5, 2011

(65) Prior Publication Data

US 2011/0291921 A1 Dec. 1, 2011

(30) Foreign Application Priority Data

May 27, 2010 (TW) ................................ 99117044 A

(51) Int. Cl.
*G09G 3/34* (2006.01)
(52) U.S. Cl.
USPC ........................................................... 345/107
(58) Field of Classification Search
USPC ........................................................... 345/107
See application file for complete search history.

(56) References Cited

U.S. PATENT DOCUMENTS

| | | | |
|---|---|---|---|
| 6,184,856 B1 | 2/2001 | Gordon, II et al. | |
| 7,279,064 B2 * | 10/2007 | Daniel et al. | 156/295 |
| 7,463,409 B2 * | 12/2008 | Daniel et al. | 359/296 |
| 7,583,430 B2 * | 9/2009 | Daniel et al. | 359/296 |
| 2003/0214697 A1 * | 11/2003 | Duthaler et al. | 359/296 |
| 2004/0119680 A1 * | 6/2004 | Daniel et al. | 345/107 |
| 2004/0263946 A9 * | 12/2004 | Liang et al. | 359/296 |
| 2007/0134825 A1 * | 6/2007 | Zou et al. | 438/18 |
| 2007/0268245 A1 * | 11/2007 | Sugita et al. | 345/107 |
| 2007/0291009 A1 * | 12/2007 | Wright et al. | 345/173 |
| 2009/0051646 A1 * | 2/2009 | Daniel et al. | 345/107 |

FOREIGN PATENT DOCUMENTS

| | | |
|---|---|---|
| CN | 1402069 | 3/2003 |
| CN | 101114101 | 1/2008 |
| TW | 200736667 | 10/2007 |
| TW | I294749 | 3/2008 |
| TW | 201016749 | 5/2010 |

OTHER PUBLICATIONS

Chinese Patent Office issued Office Action Jan. 23, 2013.
Taiwan Patent Office, "Office Action", Dec. 5, 2013.

* cited by examiner

*Primary Examiner* — Amare Mengistu
*Assistant Examiner* — Sarvesh J Nadkarni
(74) *Attorney, Agent, or Firm* — WPAT, PC; Justin King

(57) ABSTRACT

An electronic paper display device includes a first substrate, a plurality of display units and a plurality of light-emitting units. The first substrate includes first base and a plurality of electrodes disposed on the first base. The display units are disposed above the first substrate. The light-emitting units are respectively disposed between the display units and the first base.

10 Claims, 3 Drawing Sheets

ELECTRONIC PAPER DISPLAY DEVICE

CROSS-REFERENCE TO RELATED APPLICATION

This application claims the priority benefit of Taiwan application serial no. 099117044, filed on May 27, 2010. The entirety of the above-mentioned patent application is incorporated herein by reference and made a part of this specification.

BACKGROUND

The present invention relates to a display device, and more particularly to an electronic paper display device.

With the development of technology, display device, which is a communication interface between human beings and machines, continuously makes progress and develops to multi-directions, so as to meet different requirements of human beings.

Electronic paper display device regarded as a new type display device has been developed. The electronic paper display device is generally a reflective display device and displays images via reflecting light by an external light source. Therefore, the electronic paper display device requires no backlight source, thereby the electronic paper display device is compact and have a low energy consumption. However, when there isn't an external light source, the electronic paper display device is unable to display images, thus, the usage of the electronic paper display device is limited by the external light source.

BRIEF SUMMARY

The present invention provides an electronic paper display device which can display normally without an external light.

Other advantages and objects of the present invention may be further comprehended through the technical features disclosed in the present invention.

To achieve one of or part of or all of above objectives or other objectives, the present invention provides an electronic paper display device including a first substrate, a plurality of display units and a plurality of light-emitting units. The first substrate includes a first base and a plurality of electrodes disposed on the first base. The display units are disposed above the first substrate. The light-emitting units are respectively disposed between the display units and the first base.

In one embodiment of the present invention, each light-emitting unit is a microcup structure, and the display units are filled in the microcup structures.

In one embodiment of the present invention, the electronic paper display device further includes a plurality of microcup structures disposed on the first substrate. Each light-emitting unit is coated on a surface of the corresponding microcup structure, and the display units are filled in the microcup structures.

In one embodiment of the present invention, the light-emitting units are made of a phosphorescent material or a fluorescent material.

In one embodiment of the present invention, the electrodes are side electrodes arranged into a plurality of groups. Each group of side electrode comprises a first electrode and a second electrode adjacent to a group of the first electrode. Each light-emitting unit is respectively disposed between the first electrode and the second electrode of the corresponding side electrode.

In one embodiment of the present invention, the display units are microcup electrophoretic display units, microcapsule electrophoretic display units or liquid powder display units.

In one embodiment of the present invention, each light-emitting is respectively disposed on the corresponding first electrode, and the display units are bead electrophoretic display units.

In one embodiment of the present invention, each light-emitting unit is respectively disposed between the corresponding first electrode and the first base, and the display units are electrowetting display units.

The electronic paper display device of the present invention has a plurality of light-emitting units. When there isn't an external light source, the light-emitting units emit light to illuminate the display units of the electronic paper display device. Therefore, a user can view images displayed by the electronic paper display device without the external light source.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

It is to be understood that other embodiment may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items.

Figure 1:
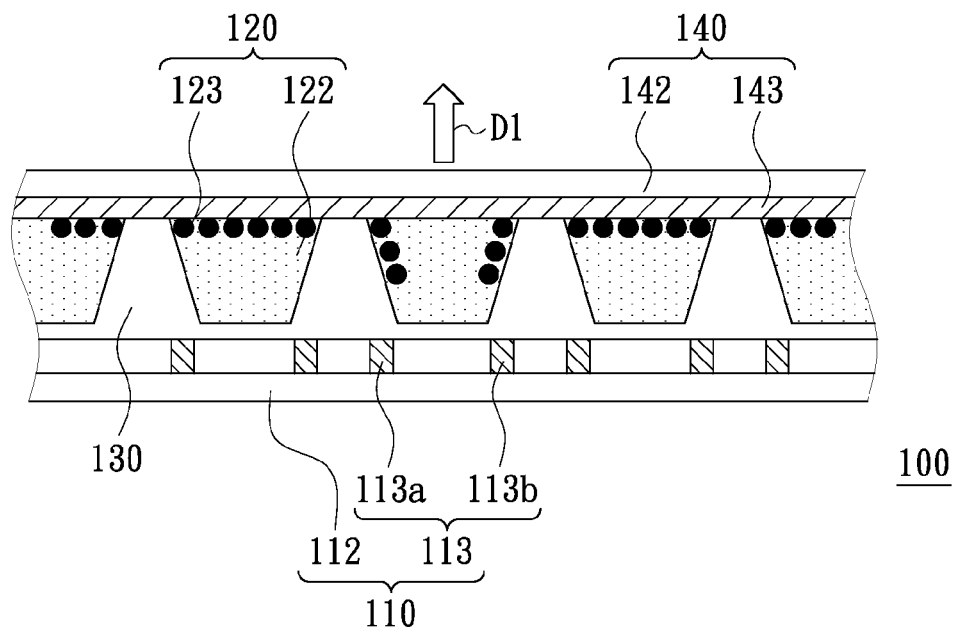
FIG. 1 is a schematic, cross-sectional view of an electronic paper display device of the first embodiment of the present invention.

FIG. 1 is a schematic, cross-sectional view of an electronic paper display device of the first embodiment of the present invention. Referring to FIG. 1, an electronic paper display device 100 of the first embodiment of the present invention includes a first substrate 110, a plurality of display units 120 and a plurality of light-emitting units 130. The first substrate 110 includes a first base 112 and a plurality of electrodes 113 disposed on the first base 112. The display units 120 are disposed above the first substrate 110. The light-emitting units 130 are respectively disposed between the display units 120 and the first base 112.

More specifically, the electrodes 113 of the first substrate 110 are side electrodes arranged into a plurality of groups. Each group of side electrode 113 includes a first electrode 113a and a second electrode 113b adjacent to a group of the first electrode 113a, and is correspondingly disposed under each corresponding display unit 120. The display units 120 may be microcup electrophoretic display units, and include electrophoretic liquid 122 and a plurality of electrophoretic particles 123 distributed in the electrophoretic liquid 122. In the present embodiment, the electrophoretic particles 123 are black charged particles, and the electrophoretic liquid 122 has a light transmittance, but the present invention is not limited to this.

In the present embodiment, the light-emitting units 130 may be microcup structures made of a phosphorescent material or a fluorescent material, preferably made of the phosphorescent material. The light-emitting units 130 are configured for accommodating the display units 120. When the light-emitting units 130 is illuminated by an external light source, the internal electrons of the phosphorescent material or the fluorescent material will absorb light energy and then transit to an excited state, after that, the phosphorescent material or the fluorescent material will decay to a ground state and emit light. Since a decay speed of the internal electrons of the phosphorescent material is different from that of the fluorescent material, when the external light source is removed, the light-emitting units 130 made of the phosphorescent material can continuously emit light.

In addition, the electronic paper display device 100 further includes a second substrate 140. The second substrate 140 includes a second base 142 and an electrode 143 disposed on the second base 142. Furthermore, the second substrate 140 is disposed on the display units 120, and the electrode 143 faces to the electrodes 113.

More specifically, when the side electrodes 113 and the electrode 143 of the electronic paper display device 100 are supplied with a bias voltage, the electrophoretic particles 123 of the display units 120 in a predetermined area which does not show black images will move toward a direction above the first electrode 113a and the second electrode 113b. Meanwhile, light emitted by the light-emitting units 130 will exit from the electronic paper display device 100 along a direction D1 via passing through the display units 120. Therefore, even if the external light source is removed, a user could also view images displayed by the electronic paper display device 100.

Figure 2:
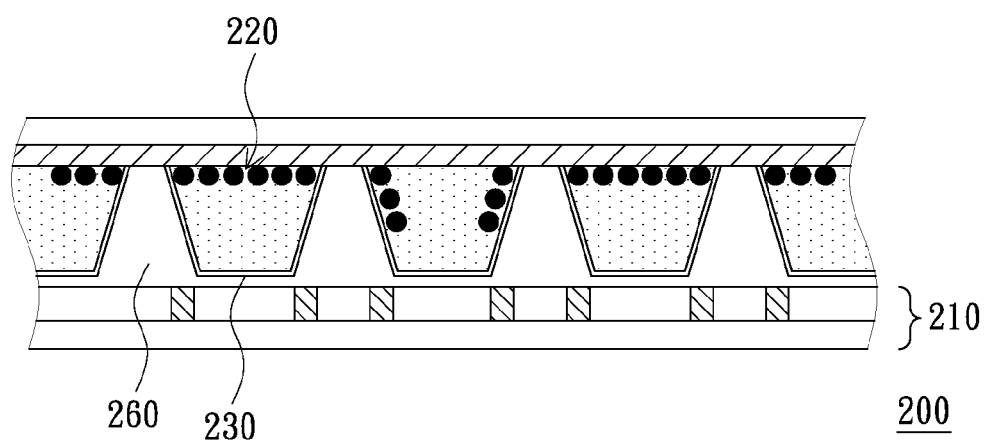
FIG. 2 is a schematic, cross-sectional view of an electronic paper display device of the second embodiment of the present invention.

FIG. 2 is a schematic, cross-sectional view of an electronic paper display device of the second embodiment of the present invention. Referring to FIG. 2, an electronic paper display device 200 of the second embodiment of the present invention is similar to the electronic paper display device 100 of the first embodiment, wherein the difference is that a plurality of microcup structures 260 are disposed on a first substrate 210 and each light-emitting unit 230 of the electronic paper display device 200 is coated on a surface of a corresponding microcup structure 260. A plurality of display units 220 are filled in the microcup structures 260.

More specifically, a method for forming the light-emitting units 230 could be selected from one of slit coating, screen coating, spin coating and ink printing, but the present invention is not limited to this. A material of the light-emitting units 230 is the same as or similar to the light-emitting units 130 mentioned above.

Figure 3:
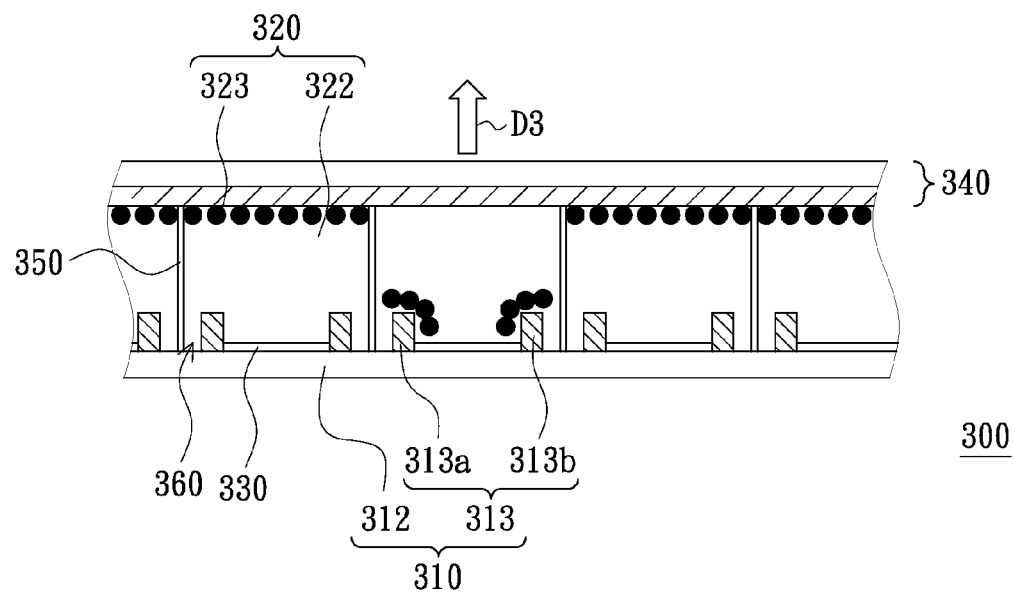
FIG. 3 is a schematic, cross-sectional view of an electronic paper display device of the third embodiment of the present invention.

FIG. 3 is a schematic, cross-sectional view of an electronic paper display device of the third embodiment of the present invention. Referring to FIG. 3, an electronic paper display device 300 of the third embodiment of the present invention is similar to the electronic paper display device 100 of the first embodiment, wherein the difference is that a plurality of display units 320 are liquid powder display units.

The electronic paper display device 300 further includes a plurality of partition elements 350. The partition elements 350 are disposed on a first base 312 of a first substrate 310. The partition elements 350 form a plurality of accommodating rooms 360 between the first substrate 310 and a second substrate 340. The display units 320 are filled in the accommodating rooms 360. Each display unit 320 includes air medium 322 and a plurality of liquid powders 323 distributed in the air medium 322.

In the present embodiment, a plurality of electrodes 313 disposed on the first substrate 310 are side electrodes arranged into a plurality of groups. Each group of side electrode 313 includes a first electrode 313a and a second electrode 313b adjacent to the first electrode 313a. Moreover, each light-emitting unit 330 is respectively disposed between the first electrode 313a and the second electrode 313b of the corresponding side electrode 313. As mentioned above, the light-emitting units 330 could be made of a phosphorescent material or a fluorescent material. A method for forming the light-emitting units 330 on the first base 312 can be selected from one of slit coating, screen coating, spin coating and ink printing, but the present invention is not limited to this.

Each group of side electrode 313 and each light-emitting unit 330 correspond to a display unit 320. More specifically, when the electronic paper display device 300 is supplied with a bias voltage, the liquid powders 323 of the display units 320 in a predetermined area which does not show black images will move toward the first electrode 313a and the second electrode 313b. Meanwhile, light emitted by the light-emitting units 330 will exit from the electronic paper display device 300 along a direction D3, which provides a light source for the electronic paper display device 300 to display images.

Figure 4:
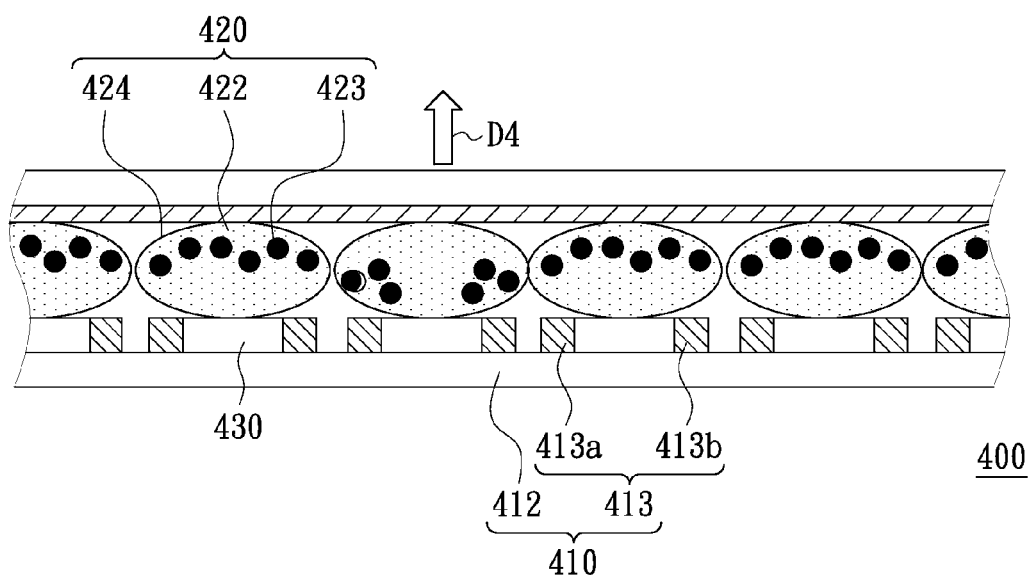
FIG. 4 is a schematic, cross-sectional view of an electronic paper display device of the fourth embodiment of the present invention.

FIG. 4 is a schematic, cross-sectional view of an electronic paper display device of a fourth embodiment of the present invention. Referring to FIG. 4, an electronic paper display device 400 of the fourth embodiment of the present invention is similar to the electronic paper display device 300 of the third embodiment, wherein the difference is that a plurality of display units 420 are microcapsule electrophoretic display units. Each display unit 420 includes electrophoretic liquid 422, a plurality of electrophoretic particles 423 distributed in the electrophoretic liquid 422 and a microcapsule 424 for packaging the electrophoretic liquid 422 and the electrophoretic particles 423.

Similarly, when the electronic paper display device 400 is supplied with a bias voltage, the electrophoretic particles 423 move toward a first electrode 413a and a second electrode 413b, so that light emitted by a light-emitting unit 430 will exit from the electronic paper display device 400 along a direction D4 via passing through the display units 420, thereby providing a light source for the electronic paper display device 400 to display images.

Figure 5:
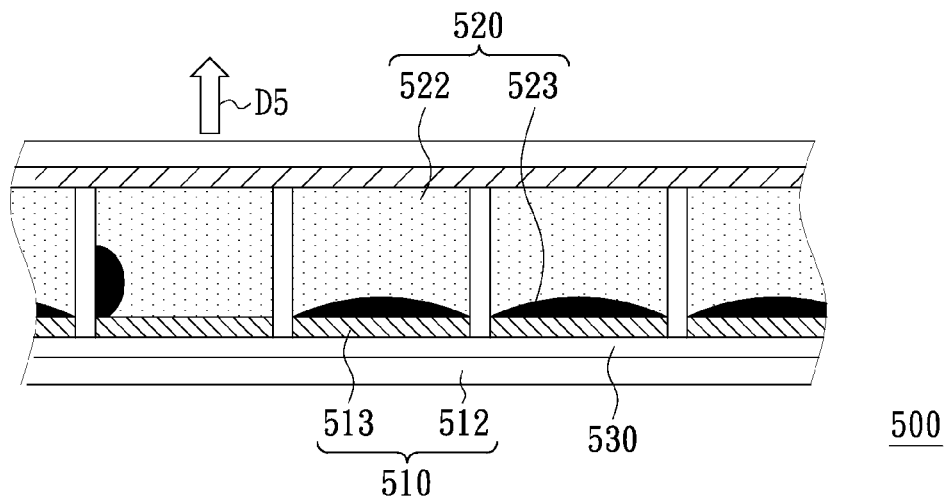
FIG. 5 is a schematic, cross-sectional view of an electronic paper display device of the fifth embodiment of the present invention.

FIG. 5 is a schematic, cross-sectional view of an electronic paper display device of the fifth embodiment of the present invention. Referring to FIG. 5, an electronic paper display device 500 of the fifth embodiment of the present invention is similar to the electronic paper display device 100 of the first embodiment, wherein the difference is that a plurality of display units 520 of the electronic paper display device 500 are electrowetting display units and a light-emitting unit 530 is disposed between a electrode 513 and a first base 512. It should be pointed out that, in the present embodiment, the light-emitting unit 530 corresponding to each display unit 520 is integrally disposed on the first base 512, but the present invention is not limited to this. In another embodiment, each display unit 520 can respectively correspond to a light-emitting unit 530.

More specifically, the display units 520 include water 522 and colored liquid 523. The colored liquid 523 is immiscible with the water 522. When the electronic paper display device 500 is not supplied with a bias voltage, the colored liquid 523 is hydrophilic and forms a flat film on a surface of the electrode 513. When the electronic paper display device 500 is supplied with a bias voltage, the colored liquid 523 is converted to hydrophobic liquid and thus moves toward a side of the electrode 513. Meanwhile, light emitted by the light-emitting unit 530 will exit from the electronic paper display device 500 along a direction D1, so that a user can view images displayed by the electronic paper display device 500.

Figure 6:
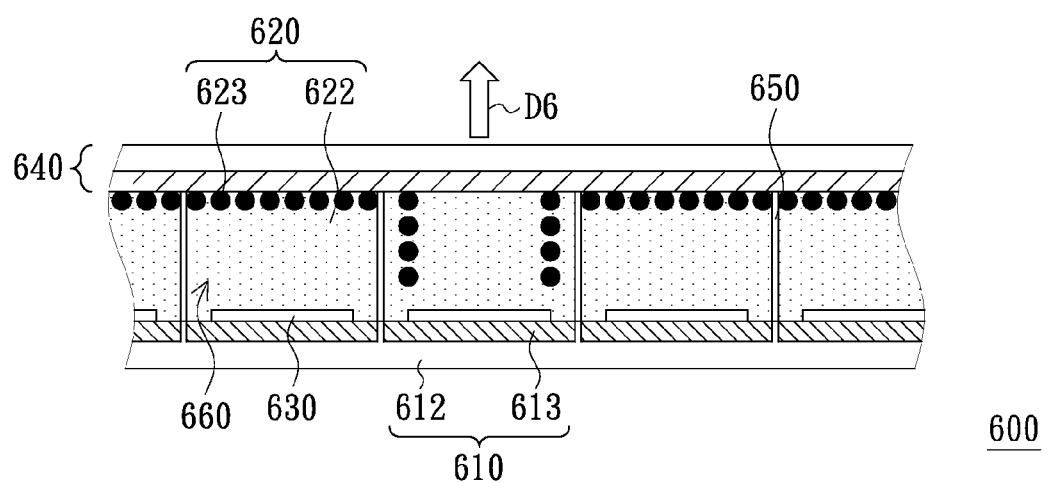
FIG. 6 is a schematic, cross-sectional view of an electronic paper display device of the sixth embodiment of the present invention.

FIG. 6 is a schematic, cross-sectional view of an electronic paper display device of the sixth embodiment of the present invention. Referring to FIG. 6, an electronic paper display device 600 of the sixth embodiment of the present invention is similar to the electronic paper display device 100 of the first embodiment, wherein the difference is that a plurality of display units 620 of the electronic paper display device 600 are bead electrophoretic display units and each light-emitting unit 630 is respectively disposed on a corresponding electrode 613.

The electronic paper display device 600 further includes a second substrate 640 and a plurality of partition elements 650. The partition elements 650 are disposed on the first substrate 610 and form a plurality of accommodating rooms 660 between the first substrate 610 and the second substrate 640. The display units 620 are filled in the accommodating rooms 660. Each display unit 620 includes liquid 622 and a plurality of neutral particles 623 distributed in the liquid 622.

When the electronic paper display device 600 is supplied with a bias voltage, the neutral particles 623 are polarized to charged particles. Moreover, the neutral particles 623 are beaded to each other and distributed at both side of the light-emitting units 630. Meanwhile, light emitted by the light-emitting units 630 will exit from the electronic paper display device 600 along a direction D6. Therefore, even if the external light source is removed, a user can also view images displayed by the electronic paper display device 600.

In summary, these embodiments of the present invention at least include the following advantages.

1. The electronic paper display device of the present invention has light-emitting units. The light-emitting units can absorb light energy of the external light source and emit light to illuminate the display units of the electronic paper display device. Additionally, in these embodiments that the light-emitting units are made of the phosphorescent material, even if the external light source is removed, the light-emitting units also continuously provide a light source for the electronic paper display device to display images, thereby a user can view images displayed by the electronic paper display device.

2. The display units of the electronic paper display device of the present invention may be microcup electrophoretic display units, microcapsule electrophoretic display units, liquid powder display units, bead electrophoretic display units or electrowetting display units. Therefore, the electronic paper display device of the present invention has a great applicability, so that a user can select different types of display units according to actual requirements.

The above description is given by way of example, and not limitation. Given the above disclosure, one skilled in the art could devise variations that are within the scope and spirit of the invention disclosed herein, including configurations ways of the recessed portions and materials and/or designs of the attaching structures. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. An electronic paper display device, comprising:
    a first substrate;
    a second substrate;
    a plurality of display units disposed above the first substrate and below the second substrate, defined by a plurality of partition elements disposed on the first substrate and positioned between the first substrate and a second substrate, forming a plurality of accommodating rooms for the corresponding plurality of display units, wherein each display unit includes an air medium and a plurality of liquid powders distributed in the air medium;
    a plurality of groups of side electrodes disposed on the first substrate, each group of side electrodes comprising a first electrode and a second electrode, wherein each group of side electrodes is disposed in each accommodating room and not in contact with the plurality of partition elements; and
    a plurality of light-emitting units, each light-emitting unit disposed between the first electrode and the second electrode of the corresponding group of side electrodes, positioned between the display units and the first base;
    wherein, the light-emitting units are configured for absorbing light energy from an external light source supplying light through the second substrate, and emitting light directed away from the first substrate and through the second substrate for displaying images.

2. The electronic paper display device as claimed in claim 1, wherein each light-emitting unit is a microcup structure, and the display units are filled in the microcup structures.

3. The electronic paper display device as claimed in claim 1, further comprising a plurality of microcup structures disposed on the first substrate, wherein each light-emitting unit is coated on a surface of the corresponding microcup structure, and the display units are filled in the microcup structures.

4. The electronic paper display device as claimed in claim 1, wherein the light-emitting units are made of a phosphorescent material or a fluorescent material.

5. The electronic paper display device as claimed in claim 1, wherein the electrodes are side electrodes arranged into a plurality of groups, each group of side electrode comprises a first electrode and a second electrode adjacent to the first electrode, each light-emitting unit is respectively disposed between the first electrode and the second electrode of the corresponding side electrode.

6. The electronic paper display device as claimed in claim 5, wherein the display units are microcup electrophoretic display units, microcapsule electrophoretic display units or liquid powder display units.

7. The electronic paper display device as claimed in claim 1, wherein each light-emitting is respectively disposed on the corresponding electrode.

8. The electronic paper display device as claimed in claim 7, wherein the display units are bead electrophoretic display units.

9. The electronic paper display device as claimed in claim 1, wherein each light-emitting unit is respectively disposed between the corresponding electrode and the first base.

10. The electronic paper display device as claimed in claim 9, wherein the display units are electrowetting display units.

* * * * *